United States Patent [19]

Ducret

[11] 4,437,237

[45] Mar. 20, 1984

[54] SWING SAW FOR CUTTING METAL CONDUIT

[76] Inventor: Lucien C. Ducret, 28 Lockwood Dr., Old Greenwich, Conn. 06870

[21] Appl. No.: 406,104

[22] Filed: Aug. 6, 1982

[51] Int. Cl.³ ............................................. B27B 19/14
[52] U.S. Cl. ........................................ 30/90.2; 30/92; 30/378
[58] Field of Search ............. 30/90.1, 90.2, 92, 166 R, 30/166 A, 378

[56] References Cited

U.S. PATENT DOCUMENTS

| 1,111,388 | 9/1914 | Johnson | 30/90.2 |
| 2,227,844 | 1/1941 | Roche | 30/92 |
| 2,329,729 | 9/1943 | Saucke | 30/92 |
| 2,342,322 | 2/1944 | Ailstock | 30/90.2 |
| 3,284,895 | 11/1966 | Selander | 30/90.2 |
| 3,834,019 | 9/1974 | Smeltzer | 30/92 |
| 4,349,928 | 9/1982 | Mlikotin | 30/378 X |

Primary Examiner—Jimmy C. Peters
Attorney, Agent, or Firm—DeLio and Libert

[57] ABSTRACT

A hand tool comprising elements for clamping a conduit or cable to be cut, a saw blade supporting assembly pivotally connected to the clamping elements, in a manner to guide the saw in its desired cutting path, and means for causing sawing movement of the saw blade, the saw blade supporting assembly and the clamping elements being so juxtaposed that they can be gripped by one hand of the tool operator to cause both gripping of the work and advancement of the saw blade in its cutting position; the other hand of the operator being available to effect cutting movement of the saw blade.

10 Claims, 11 Drawing Figures

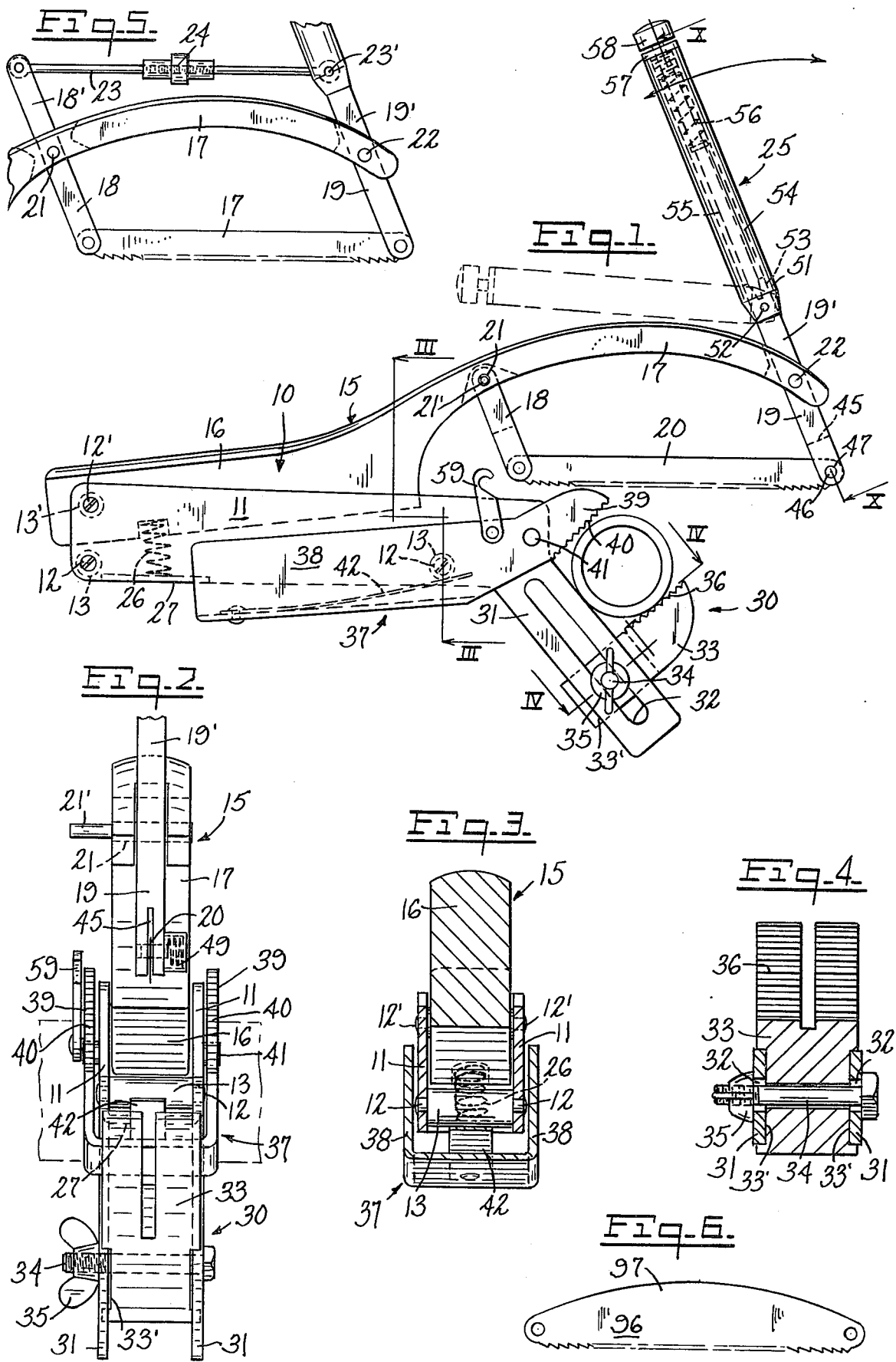

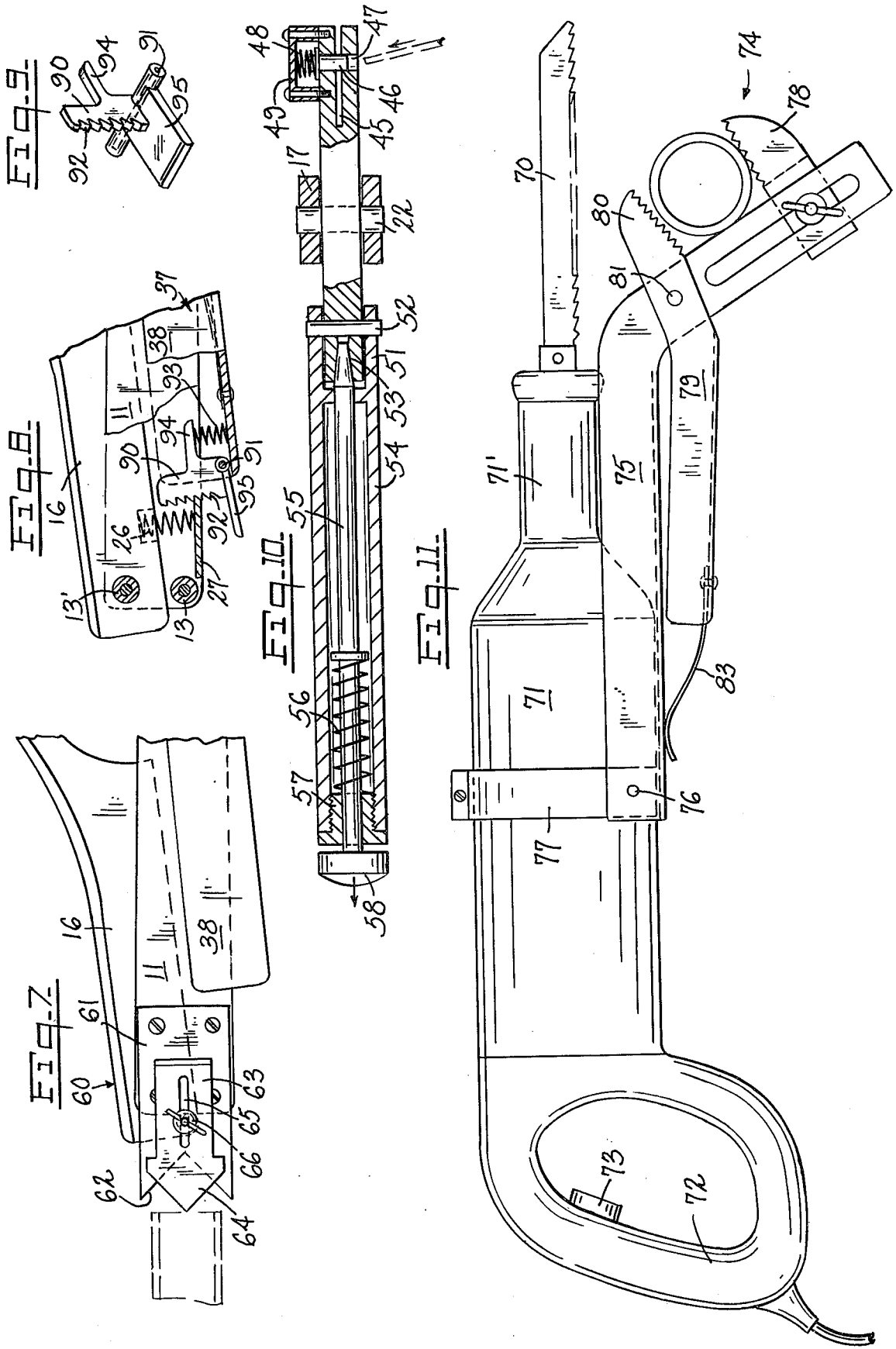

SWING SAW FOR CUTTING METAL CONDUIT

This invention relates to a swing saw in the nature of a hand tool for cutting elongated materials such as tubular metal conduit or cable, and particularly a flexible conduit comprising a metal tube covered with a plastic jacket.

BACKGROUND OF THE INVENTION

Plastic clad metal conduit of the type referred to is commonly used outdoors in connection with commercial installations such as air conditioning apparatus or indoors for supplying hydraulic or pneumatic power to a point of utilization. The ends of the conduit sections are normally cut square and used with special fittings with seals which provide an assembly impervious to fluids such as water or oil.

Such conduit is usually cut with a hacksaw, but the flexibility of the conduit makes this somewhat difficult. The operation may be facilitated by a device utilizing a small miter box to guide the hacksaw, but considerable effort is still required to hold the conduit and obtain a clean cut.

OBJECTS OF THE INVENTION

It is an object of the present invention to provide a hand tool which has both conduit-holding means and conduit cutting means.

It is a further object of the invention to provide such a tool wherein the cutting means is a hacksaw and the holding means is an alligator-type clamp.

It is another object of the invention to provide a tool wherein the hacksaw can be operated with a mechanical advantage to cut the work rapidly and accurately in a plane perpendicular to the length of the conduit.

It is a still further object of the invention to provide a hand tool wherein the firm grip of one hand of the operator serves both to maintain clamping pressure on the work and to maintain downward cutting pressure on the saw.

It is yet another object of the invention to provide a tool wherein certain parts can be folded to relatively retracted positions, and held there, for convenience in carrying and/or storing the tool.

It is also an object of the invention to provide certain improvements in the form, construction and arrangement of the several parts of the tool whereby the above-named and other objects may effectively be attained.

The invention accordingly comprises the features of construction, combination of elements, and arrangement of parts which will be exemplified in the construction hereinafter set forth, and the scope of the invention will be indicated in the claims.

SUMMARY OF THE INVENTION

The tool comprises an elongated main body portion adapted to be grasped by the operator's hand, an elongated saw carrier pivotally connected to the body portion at their rear ends, a saw blade connected to the carrier by parallel links (one of which is extended to constitute an operating handle), a clamping lever pivotally mounted adjacent the forward end of the body portion and a clamp carrier integral with the body portion and extending downwardly at an angle from said forward end of the body portion. The active elements of the work clamp are constituted by a fixed jaw adjustably mounted on the clamp carrier, and a serrated jaw surface on the clamping lever, facing the fixed jaw. The parts are arranged and proportioned so that work held firmly in the clamp lies in the cutting path of the saw blade when the saw carrier is depressed, and the blade can be reciprocated by actuation of the operating handle to effect cutting of the work.

BRIEF DESCRIPTION OF THE DRAWINGS

A practical embodiment of the invention is shown in the accompanying drawings wherein:

FIG. 1 represents a side elevation of the tool, with a piece of conduit in position to be cut, but not clamped, and the saw at rest;

FIG. 2 represents an end elevation of the tool, viewed from the right of FIG. 1;

FIG. 3 represents a vertical section on the line III—III of FIG. 1;

FIG. 4 represents a detail section on the line IV—IV of FIG. 1;

FIG. 5 represents a detail side elevation of the bow portion of the saw carrier with blade tensioning means added;

FIG. 6 represents a detail side elevation of a modified form of saw blade;

FIG. 7 represents a detail elevation of a modification, wherein burr removing means is carried, optionally, on the rear end of the body portion;

FIG. 8 represents a detail elevation, partly in section, of the rear end of the clamping lever and body portion, showing a releasable latch for temporary locking of the clamp;

FIG. 9 is an perspective view of the latch member alone;

FIG. 10 represents an axial section, on an enlarged scale, on the line X—X of FIG. 1; and FIG. 11 represents a side elevation of an alternative form of tool wherein the reciprocation of the saw blade is effected by an electric motor, the clamping of the work and the feeding of the work to the saw blade being effected by manual force as in FIG. 1.

DETAILED DESCRIPTION

Referring to the drawings, the body portion 10 is constituted by a pair of elongated side plates 11, held in parallel spaced relation by screws 12, 12' which pass through the bores of tubular spacers 13, 13', there being two such points of connection adjacent the rear end of the body portion and one near the forward end, as clearly appears in FIG. 1.

The saw carrier 15 comprises a handle portion 16 and a bow portion 17 integral with the handle, the handle portion being shorter than the body portion 10 and pivotally mounted thereon by means of the upper rear spacer 13'. The bow portion 17 projects forwardly from the handle portion, in a flat arch, a distance sufficient to provide a "parallelogram" mounting for the blade support links 18 and 19 carrying a hacksaw-type blade 20. The link 18 is pivotally mounted at a point 21 near the base of the bow portion and the link 19 is mounted at the forward end of the bow portion at the point 22, this forward link having an upward extension 19' on which is mounted a foldable handle 25, described below. The saw carrier assembly is biased toward the raised position shown in FIG. 1 by a spring 26 which rests on a short "floor" piece 27 extending between the plates 11 near their rear ends.

In order to maintain the saw blade under tension, as is customary in hack-saw construction, the link 18 can be provided with an upward extension 18', as shown in FIG. 5 which is connected by a tensioning rod 23 with turnbuckle 24, to a pivot pin 23' on the extension 19' of the link 19, the tensioning assembly 23, 24 forming, with the saw blade and the links, a substantially perfect parallelogram.

The conduit clamp 30 is constituted by elongated clamp plates 31, preferably integral with side plates 11 and projecting downwardly and forwardly from the forward ends of the side plates. The clamp plates are provided with elongated slots 32 and a lower clamp jaw 33 is slidably mounted between the plates, being held in any desired adjusted position by means of a bolt 34, FIG. 4, passing through a hole in the clamp jaw, through the slots 32 and carrying the wing nut 35 adjacent its free end. The sides of the clamp jaw are rabbeted as shown at 33' to form rectangular grooves which receive the plates 31 with a close sliding fit, so that the jaw maintains a constant angle with said plates in every adjusted position. The working face 36 of the clamp jaw 33 is serrated and it is deeply slotted as shown in FIG. 4. The clamp is completed by the clamping lever 37, having a handle portion 38 (channel-shaped in cross-section, FIG. 2) and a pair of spaced jaw portions 39 each having a serrated edge 40 facing the clamp jaw face 36. The lever 37 is pivotally mounted on the walls of the body portion by means of separate pivots 41, one on each side to leave clear the space between side plates 11; the pivots 41 may be screws or rivets and the lever is biased toward a clamp open position by the leaf spring 42 bearing against the forward spacer 13.

The links 18 and 19 may conveniently be rectangular in cross-section and slotted at their lower ends to provide freedom of movement for the saw blade mounted therein. A releasable blade attachment device is shown at the right of FIG. 10 wherein the saw blade end (not shown) fits freely in the slot 45 with the pin 46 passing through the hole normally provided at each end of a hacksaw blade. The pin 46 rests slidably in the bore 47 which traverses the link 19 (or 18) and is held in blade-locking position by the spring 48 within a protective cap 49. To retract the pin 46 a nail or other small pointed device may be inserted in the open end of the bore 47, causing compression of the spring 48; with the pin pushed back a hacksaw blade can readily be inserted or removed. The foldable handle 25, as shown in FIG. 6, has a clevis end 51 pivotally mounted by the pin 52 near the upper end of the link extension 19', which link end is also provided with a tapered axial socket 53. The handle body 54 is hollow and houses a plunger 55, the tapered lower end of which is urged toward engagement in socket 53 by the spring 56. The plunger passes freely through the bore of a plug 57 secured in the end of the handle, and the outer end of the plunger is provided with a button 58 by means of which the plunger can be moved, against the urging of the spring 56, to free its tapered end from the socket 53 when it is desired to fold the handle, e.g., toward the position shown in broken lines in FIG. 1.

The folding of the tool is also facilitated by the provision of a latch or hook 59 which can be hooked over the projecting end 21' of the pivot 21 to hold the saw and clamp assemblies in their most compact over-all positions; the handle 25 being also folded back, of course.

As a desirable additional feature, the de-burring device shown in FIG. 7 may be added, for instance, at the rear end of the body portion 60, this device comprising a flat metal plate 61 the square end of which is riveted to the side of body portion 11 while the end having a 90° V-shaped notch 62 projects rearwardly. A separate flat metal plate 63 having a 90° pointed end 64 and a longitudinal slot 65 is adjustably secured to the plate 61 by means of a wing nut and bolt 66. The edges of the notch and of the point are sharpened sufficiently to remove burrs from the cut ends of conduit sections when the ends are pressed against the said edges, at their intersection, and the conduit section manually rotated. Adjustment for different diameters can be effected by sliding the plate 63 relative to the plate 61.

In the alternative form of tool shown in FIG. 11 the band saw assembly of FIG. 1 is replaced by an electric power operated saber-saw comprising the saw blade 70 projecting from one end of the elongated housing 71 which contains a motor and is held by the hand grip 72 containing a switch 73. The work holding assembly 74 is similar, in its clamping elements, to the corresponding parts described above. The body portion is constituted by side plates 75 pivotally mounted at points 76 adjacent their rear ends on a strap 77 encircling the housing 71. At their work-supporting ends the plates 75 extend downwardly and forwardly, like the clamp plates 31, to carry a lower clamp jaw 78, like the jaw 33, with the same means for adjustment. The clamping lever 79, with jaw 80, is pivoted at 81 on the side plates 75 so that the operator can keep the jaw faces firmly engaged with the work while the same manual gripping force urges the work holding assembly, on pivot point 76, toward the cutting position as indicated by the arrow. A leaf spring 83 on the rear of the lever 79 serves the same function as spring 42 in FIG. 1.

Since the operator may, for any reason, wish to interrupt the sawing operation before a cut has been completed, means may be provided for holding the clamp jaws in closed position on the work. Such a means is shown in FIGS. 8 and 9 as comprising a ratchet device 90 pivotally mounted at 91 adjacent the rear end of the clamping lever 37 and provided with ratchet teeth 92 in a position to engage the forward edge of the floor piece 27. The ratchet is biased toward locking position by a spring 93 between the lever 37 and a forward extension 94 and unlocking is effected by upward pressure on the rearwardly extending tab 95.

The alternative form of saw blade shown in FIG. 6 may be resorted to in order to provide greater rigidity and more accurate side guidance, or a truly square cut. This blade 96 has a convex upper edge 97 so that the middle portion has much more material—and stiffness—without any increase in blade thickness.

In the operation of the tool shown in FIGS. 1 to 6, the position of the lower jaw 33 is adjusted, by loosening the wing nut 35, sliding the jaw along the clamp plates 31 as required by the outside diameter of the conduit to be cut and tightening the wing nut, to hold the lower jaw in a position such that the conduit can be easily inserted between the face of jaw 33 and the jaw faces 40 on the jaws 39. With the saw handle 25 locked in its straight-out position (FIGS. 1 and 10) the operator grasps the tool with one hand gripping the body portion 10, the handle portion 16 of the saw carrier and the handle portion 38 of the clamping lever 37. The fulcrum point 41 of the lever 37 is close to the jaw 39, so that pressure on the handle 38 effects strong and positive gripping of the conduit between the jaws 33 and 39. The fulcrum point of the saw carrier 15 is at the screw 12' and spacer 13', so that the same gripping force which holds the conduit very firmly serves to urge the saw carrier downward in a relatively gentle and controllable manner. When the saw blade 20 has been brought into contact with the conduit, at the point where a cut is to be made, the saw is reciprocated by the use of the operator's other hand, grasping the handle 25 and moving it back and forth to cause sawing movement of the blade. Due to the linkage mounting of the saw blade the saw carrier 15 will oscillate vertically during each stroke, but short strokes are effective and the vertical oscillation can easily be accommodated by the resilience of the operator's grip on the handles. The angle of the saw teeth is preferably such that the cut material is removed primarily on the rearward (pulling) stroke of the handle. Since the jaw faces 40, 40 are widely spaced and the jaw face 36 is deeply slotted (FIG. 4) the saw blade has a clear path to cut cleanly and completely through the work piece (conduit), while the latter is held firmly at spaced points on each side of the cut.

While the clamp faces 36 and 40 are shown as being generally straight, in profile, and serrated or knurled, it will be understood that one or both faces could, if desired, be curved or V-shaped in profile.

In the event that any slight burrs are formed on the inner or outer edges of the cut surface, they can be removed very readily by means of the device shown in FIG. 7, as noted above. If the work is a cable or the like, rather than a tube, the plate 63 can be removed and the outer edge smoothed in the same manner.

In the operation of the alternative form of the tool, shown in FIG. 11, one hand of the operator grasps the reduced diameter forward portion 71' of the housing 71 in a grip which easily includes the clamping lever 79, urging the clamping lever into tight engagement with the work (conduit) and swinging the clamp assembly and work on pivot 76 toward the saw blade 70. The other hand of the operator holds the hand grip (pistol grip) 72 and presses the switch 73 to cause the motor to reciprocate the saw blade. In the operation of each embodiment, one hand is concerned only with gripping and feeding the work and the other hand is concerned only with actuation of the saw.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

What I claim is:

1. A hand tool for cutting elongated materials comprising,
   an elongated body portion having a forward end, a rear end and a clamping jaw supporting extension,
   an elongated saw blade supporting element having a handle portion and being pivotally mounted on the body portion adjacent the rear end of said portion, for movement of said blade supporting element in a plane perpendicular to its pivoting axis,
   an elongated saw blade,
   means connecting said blade to the blade supporting element,
   means for effecting cutting motion of the blade in said perpendicular plane relative to the blade supporting element,
   a first clamping jaw adjustably mounted on said jaw supporting extension,
   a clamping lever comprising an elongated handle portion and at least one forwardly positioned second clamping jaw means, and
   means pivotally mounting said lever on the body portion adjacent the forward end thereof,
   the body portion, the handle portion of the blade supporting element and the handle portion of the clamping lever being so juxtaposed that they can be grasped by one hand of a tool operator for simultaneously clamping the work and biasing the saw blade toward said work in a cutting plane perpendicular to the pivoting axis of the blade supporting element.

2. A hand tool according to claim 1 wherein the blade supporting element includes a bow portion and means connecting the blade to said bow portion.

3. A hand tool according to claim 2 wherein the means for effecting motion of the saw blade includes a handle adapted to be grasped by a second hand of the tool operator.

4. A hand tool according to claim 3 wherein the means for effecting motion of the blade includes at least one link, pivotally connected to the blade and to the bow portion of the supporting element, and having an extension constituting said handle.

5. A hand tool according to claim 4 wherein the handle is foldable.

6. A hand tool according to claim 1 wherein the second clamping jaw means comprises two laterally spaced jaw faces and the first clamping jaw is slotted in a plane corresponding to the cutting plane of the saw blade.

7. A hand tool according to claim 1 wherein the clamp jaw supporting extension is constituted by spaced clamp plates provided with elongated slots, and the first clamping jaw is provided laterally with grooves in which the clamp plates are engaged.

8. A hand tool according to claim 1 wherein the body portion comprises spaced side plates and the clamping lever is constituted by an upwardly opening channel, the saw blade supporting element being pivotally mounted on a spacer between said side plates and the clamping lever being mounted on outside surfaces of said side plates.

9. A hand tool according to claim 1 which includes means for holding the first and second clamping jaws releasably in clamping position.

10. A hand tool according to claim 1 wherein the means for effecting motion of the saw blade is an electric motor contained in the saw blade supporting element.

* * * * *